(12) United States Patent
Linden et al.

(10) Patent No.: US 7,527,129 B2
(45) Date of Patent: May 5, 2009

(54) BRAKE CARRIER HAVING IMPROVED ELECTROMECHANICAL ACTUATOR AND MOUNTING ARRANGEMENT THEREFOR

(75) Inventors: Sean W. Linden, Granger, IN (US); David A. Kolberg, Granger, IN (US); Stanley W. May, Mishawaka, IN (US); Jonathan T. Beehler, Bremen, IN (US)

(73) Assignee: Honeywell International Inc., Morristown, NJ (US)

( * ) Notice: Subject to any disclaimer, the term of this patent is extended or adjusted under 35 U.S.C. 154(b) by 389 days.

(21) Appl. No.: 11/167,165

(22) Filed: Jun. 28, 2005

(65) Prior Publication Data

US 2006/0042889 A1 Mar. 2, 2006

Related U.S. Application Data

(60) Provisional application No. 60/605,514, filed on Aug. 31, 2004.

(51) Int. Cl.
*F16D 55/08* (2006.01)
(52) U.S. Cl. .................................... 188/72.1
(58) Field of Classification Search ............. 188/73.46, 188/72.8, 72.6, 72.7, 71.5; 192/115, 84.6
See application file for complete search history.

(56) References Cited

U.S. PATENT DOCUMENTS 4,637,497 A 1/1987 Hillen
5,195,386 A * 3/1993 Havens et al. .............. 74/411.5
6,095,293 A 8/2000 Brundrett et al.
6,581,730 B1 6/2003 Haydon et al.
2005/0247529 A1* 11/2005 Gaines et al. .............. 188/72.8
2006/0102436 A1* 5/2006 Haydon et al. ............. 188/72.7

FOREIGN PATENT DOCUMENTS

| EP | 1 533 536 A1 | 5/2005 |
| WO | WO-01/20188 A1 | 3/2001 |
| WO | WO-2005/001303 A2 | 1/2005 |

* cited by examiner

*Primary Examiner*—Robert A Siconolfi
*Assistant Examiner*—James K Hsiao
(74) *Attorney, Agent, or Firm*—Birch, Stewart, Kolasch & Birch, LLP

(57) ABSTRACT

A brake actuator includes a carrier (10) having a centerline (11), a periphery and a radial slot (16) in the periphery, and an EMA (20), including an electric motor (30) having a longitudinal centerline (31) and a ram (34) having a longitudinal centerline (35) operatively connected to the electric motor (30), where the electric motor (30) is designed to move the ram (34) in the direction of the ram longitudinal centerline (35), the EMA (20) being mounted on the carrier (10) in the slot (16) with the ram longitudinal centerline radially (35) inward of the periphery and the motor longitudinal centerline (31) radially outward of the periphery. Also the EMA (20) used in the brake actuator.

9 Claims, 5 Drawing Sheets

BRAKE CARRIER HAVING IMPROVED ELECTROMECHANICAL ACTUATOR AND MOUNTING ARRANGEMENT THEREFOR

RELATED APPLICATIONS

The present application claims the benefit of U.S. Provisional Patent Application No. 60/605,514, filed Aug. 31, 2004, the contents of which are hereby incorporated by reference.

FIELD OF THE INVENTION

The present invention is directed toward a brake carrier and an electromechanical actuator ("EMA") mountable thereon, and, more specifically, toward a brake carrier having a radial slot and an EMA mountable in the slot.

BACKGROUND OF THE INVENTION

A brake disk stack comprises a plurality of stators disposed between a plurality of rotors. The rotors are connected to a vehicle wheel while the stators are fixed to, for example, a wheel support and brake. A brake employing such a disk stack acts by compressing the stack of rotors and stators to slow the rotors and the wheel attached to the rotors.

Various actuators are known for compressing a disk stack, among them, an EMA. FIG. 5 illustrates a braking system comprising a brake carrier 200 and a pressure plate 202 which forms part of a brake disk stack 204. An EMA 206 is mounted on the side of brake carrier 200 opposite disk stack 204 so that a piston 208 of the EMA 206 extends through an opening 210 in the brake carrier 200. Several openings 212, illustrated in FIG. 6, are provided in brake carrier 200 for receiving fasteners 214, such as screws or bolts, illustrated in FIG. 5.

In operation, piston 208 moves toward the brake disk stack 204 and presses against the pressure plate 202 which in turn compresses the rotors and stators in a well-known manner. The reactive force of this movement is borne by the four fasteners 214 which prevent the EMA 206 from separating from the carrier plate 200 and which must therefore be sized to reliably withstand what can be significant stresses.

To remove or attach EMA 206, fasteners 214 are removed, and EMA 206 is moved axially with respect to the brake carrier 200 until piston 208 is clear of opening 210. Because of the tight clearances in many devices employing such an arrangement, aircraft brakes, for example, it therefore is sometimes not possible to move EMA 206 axially a sufficient distance to allow the piston 208 to clear opening 210. It is therefore sometimes necessary to remove part or all of the disk stack 204, or other elements in the vicinity of the disk stack, to successfully remove the EMA 206. This complicates the repair or replacement of EMA 206.

SUMMARY OF THE INVENTION

These problems and others are addressed by the present invention which comprises, in a first embodiment, an electromechanical actuator (EMA) that includes a housing having a first side and a second side and an opening through the second side into the housing. An electric motor is supported by the housing, and a ram having a longitudinal axis is mounted in the housing for linear movement through the opening and toward and away from the first side and is operatively connected to the electric motor. The housing has a first portion at the first side having a first width, a second portion at the second side having a second width greater than the first width and a transition wall connecting the first portion to the second portion.

A further aspect of the invention comprises a brake actuator that includes a carrier having a centerline, a periphery and a radial slot in the periphery. An EMA includes an electric motor with a longitudinal centerline and a ram having a longitudinal centerline operatively connected to the electric motor. The electric motor is adapted to move the ram in the direction of the ram longitudinal centerline. The EMA is mounted on the carrier in the slot with the ram longitudinal centerline radially inward of the periphery and the motor longitudinal centerline radially outward of the periphery.

Another aspect of the invention comprises a brake actuator that includes a carrier having a centerline, a periphery and a radial slot in the periphery and an EMA mounted in the slot. The EMA includes a housing having a first side and a second side and an opening through the second side into the housing. An electric motor is supported by the housing, and a ram is mounted in the housing and operatively connected to the electric motor for linear movement in a direction parallel to the carrier longitudinal centerline. The housing further includes a first portion at the first side having a first width and a second portion at the second side having a second width greater than the first width and a transition wall connecting the first portion to the second portion. The first portion passes through the slot and the transition wall engages the brake carrier and substantially prevents the second portion from moving axially toward the carrier.

BRIEF DESCRIPTION OF THE DRAWINGS

These aspects of the invention and others will be better understood after a reading of the following detailed description together with the following drawings wherein.

DETAILED DESCRIPTION

Figure 1:
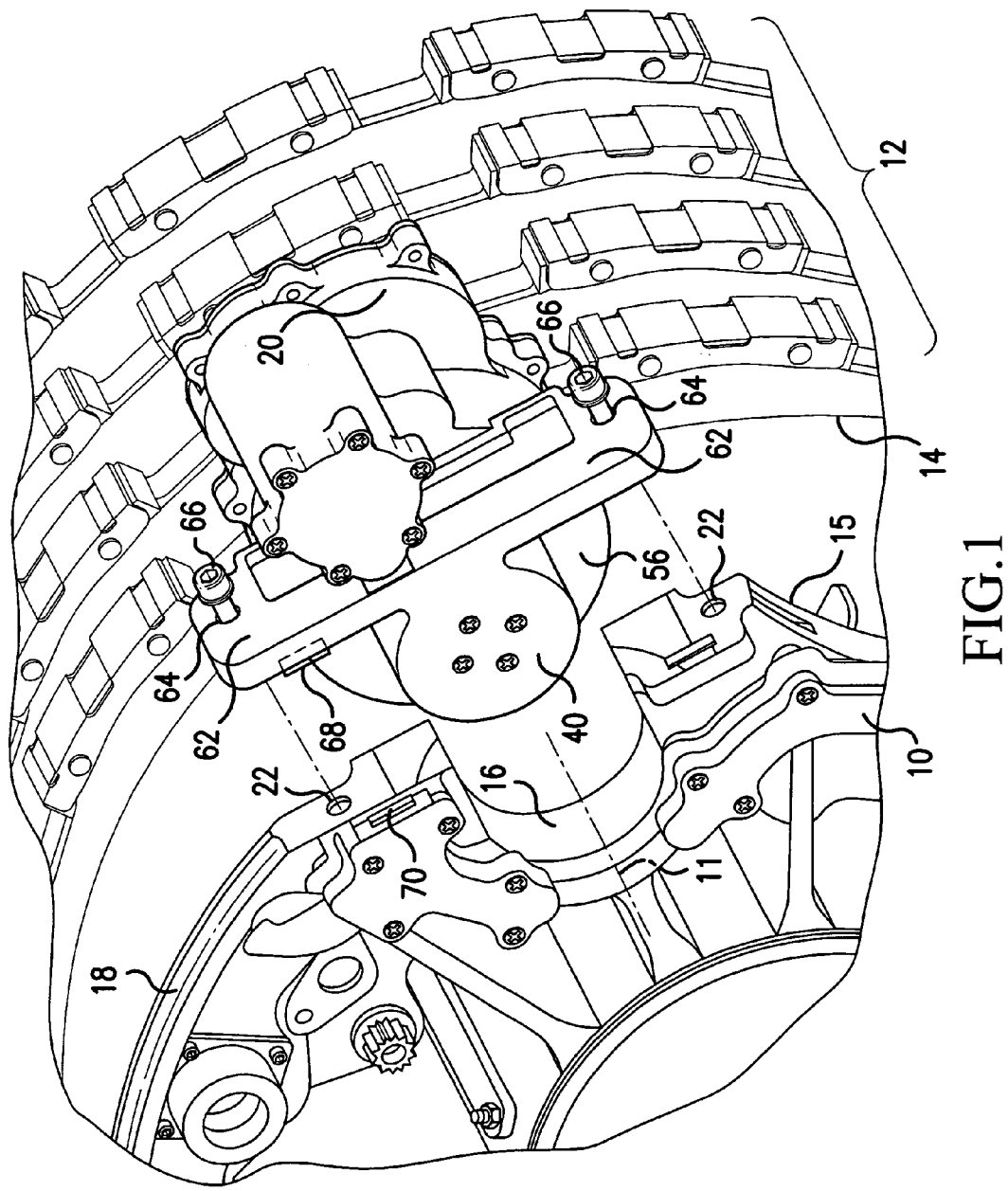
FIG. 1 is an exploded perspective view of an EMA according to an embodiment of the present invention, a brake carrier having a radial slot, and a brake stack.

Referring now to the drawings, wherein the showings are for purposes of illustrating a preferred embodiment of the invention only and not for the purpose of limiting same, FIG. 1 illustrates a brake carrier 10, having a centerline 11, supporting a brake disk stack 12 that includes a plurality of rotors and stators and a pressure plate 14. Brake carrier 10 includes a first side 15 facing pressure plate 14 and includes a radial slot 16 into carrier 10 through outer peripheral wall 18 for receiving a portion of an EMA 20. Outer peripheral wall 18 also includes mounting holes 22.

Figure 2:
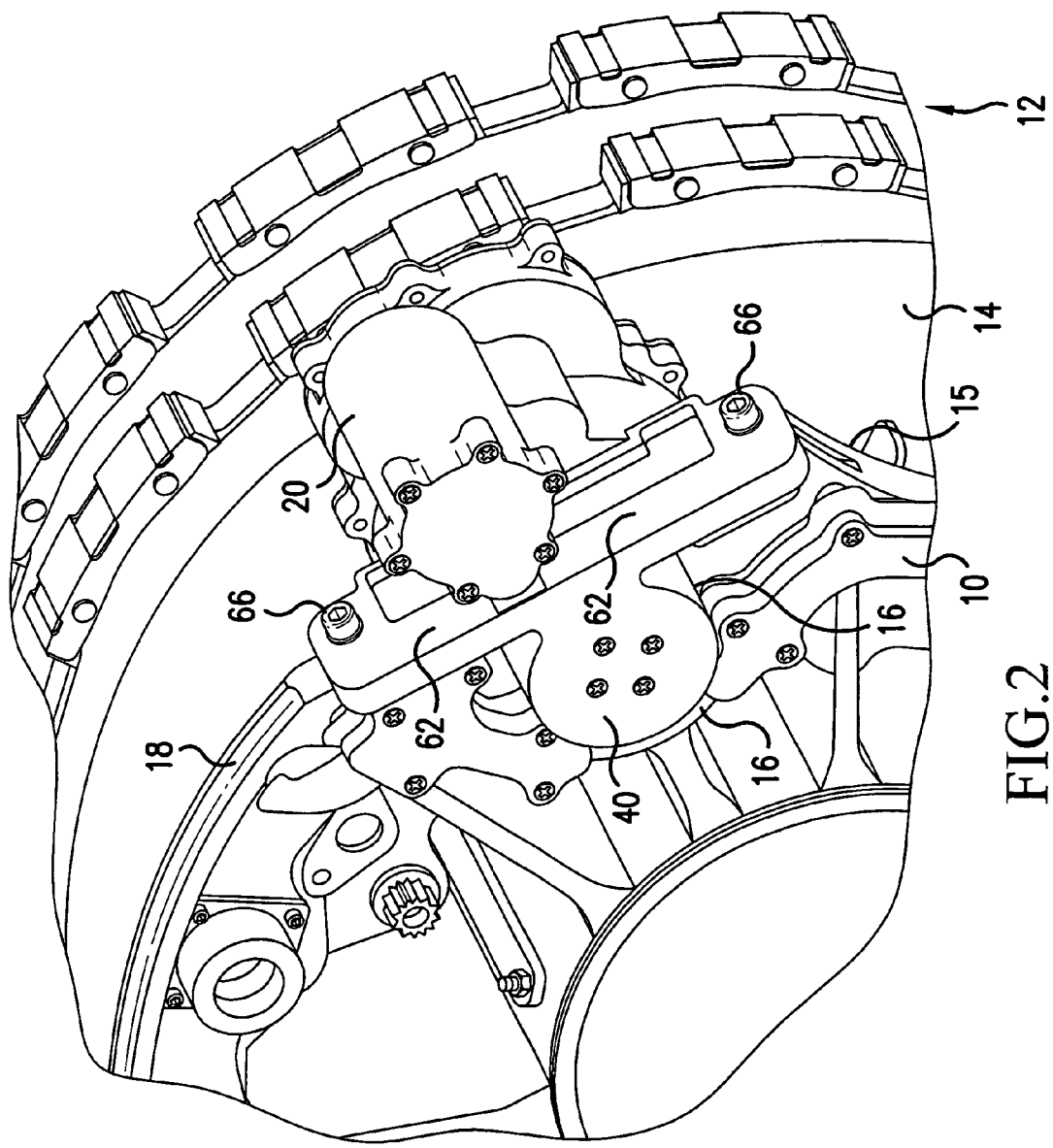
FIG. 2 is a perspective view of the EMA of FIG. 1 mounted on the brake carrier of FIG. 1.
Figure 3:
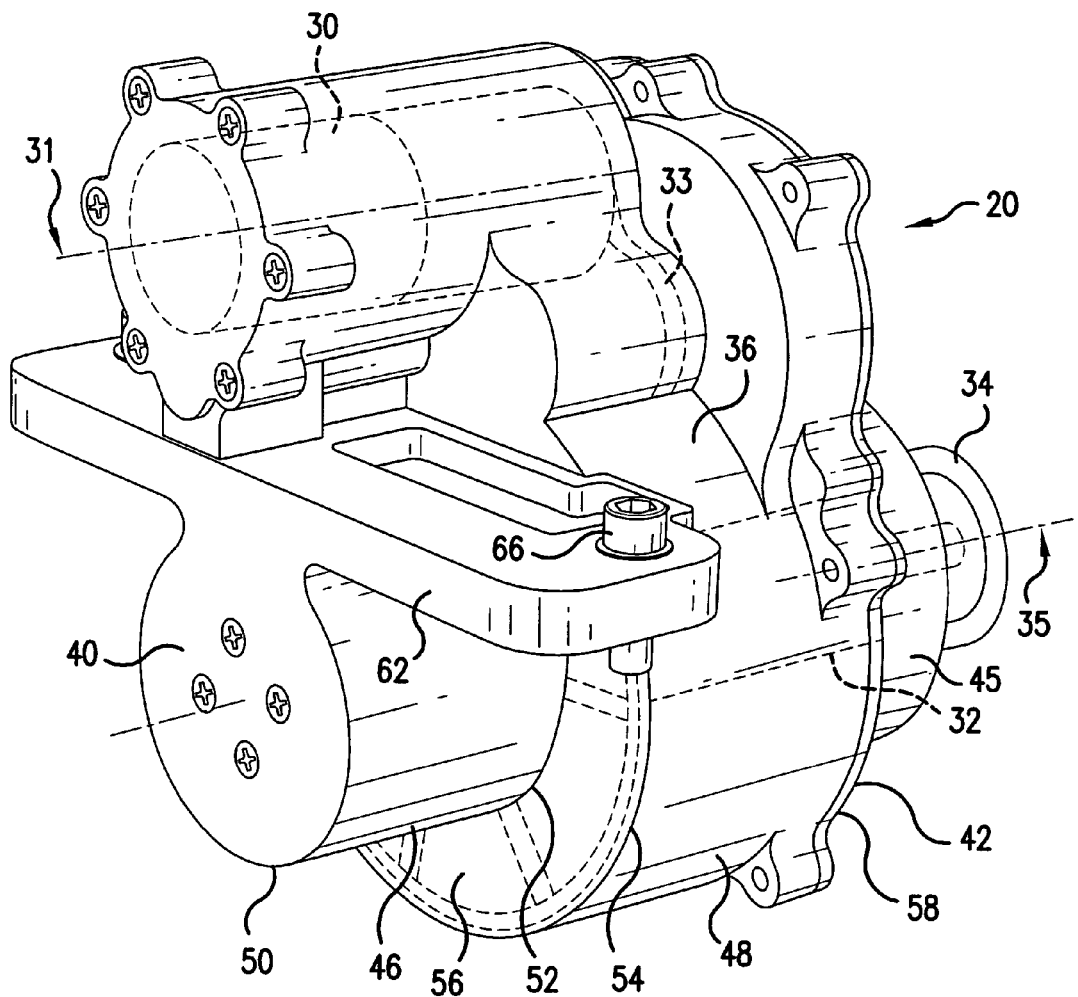
FIG. 3 is a rear perspective view of the EMA of FIG. 1.
Figure 4:
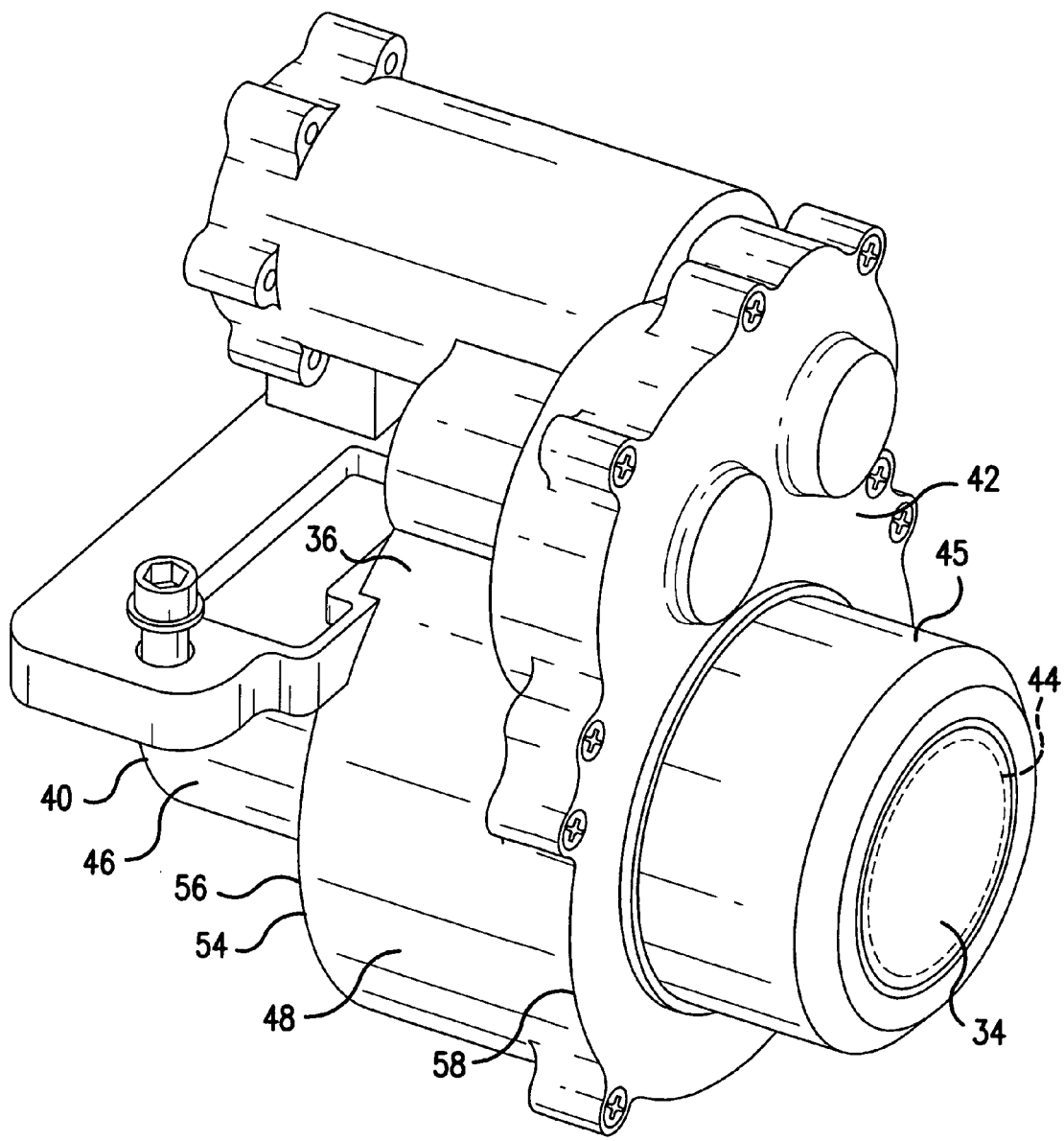
FIG. 4 is a front perspective view of the EMA of FIG. 1.
Figure 5:
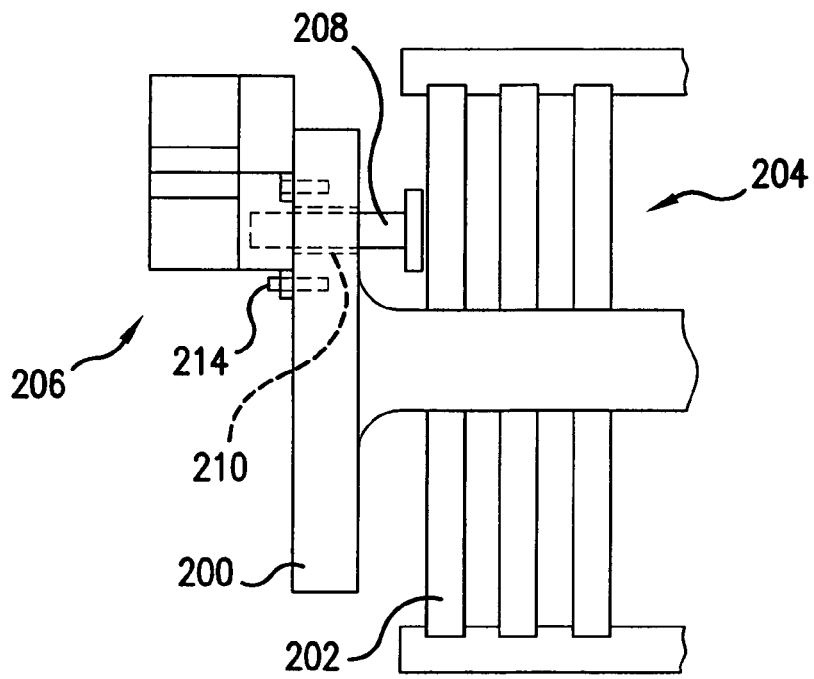
FIG. 5 illustrates a side elevational view of a conventional EMA mounted on a conventional carrier.
Figure 6:
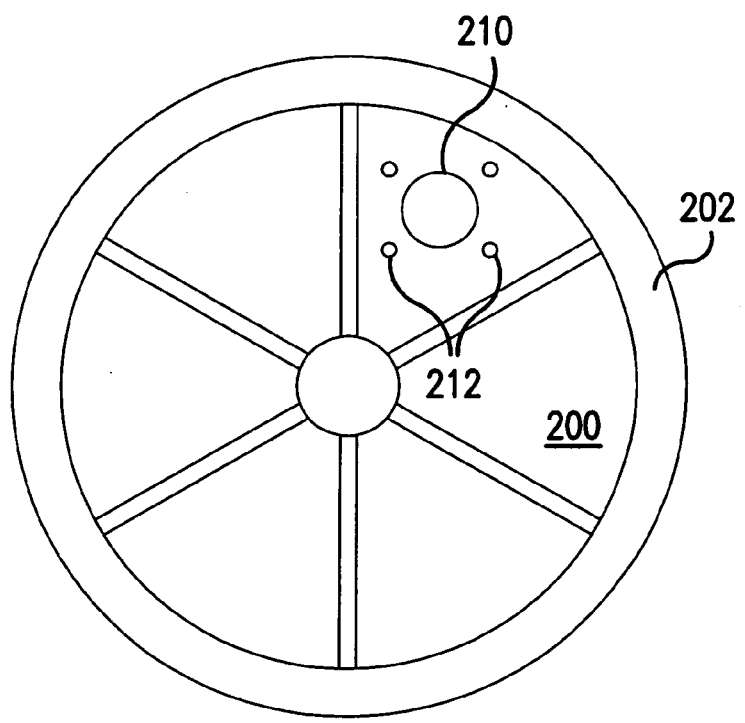
FIG. 6 is an end elevational view of the carrier of FIG. 5.

EMA 20 is illustrated in association with carrier 10 in FIGS. 1 and 2 and by itself in FIGS. 3 and 4. The primary functional elements of the EMA 20 are relatively standard and are not described in detail. These include a motor 30 having a centerline 31, a ballscrew/ballnut assembly 32, gears 33 operatively connecting the motor 30 to the ballnut/ballscrew assembly 32 and a ram or piston 34 movable in forward and reverse directions along a centerline 35. These elements are contained within a housing 36, and the position of ram 34 with respect to the housing is controlled by operating the motor 30 in forward or reverse directions.

With reference to FIGS. 3 and 4, housing 36 has a first side 40 and a second side 42 that includes an opening 44 through which ram 34 moves relative to housing 36. Opening 44 may be formed in second side 42 or in a guide sleeve 45 projecting from side 42 as best seen in FIG. 4. Housing 36 also includes a first portion 46 having a first width and a second portion 48 having a second width greater than the first width. First portion 46 has a first end 50 at first side 40 and a second end 52 adjacent a first end 54 of second portion 48.

Transition wall 56 connects the second end 52 of first portion 46 to the first end 54 of second portion 48. Second portion 48 has a second end 58 at second side 42 of housing 36. Transition wall 56 forms part of housing 36 and helps to enclose piston 34; transition wall 56 also serves as a reaction surface and is pressed against first side 15 of carrier 10 when piston 34 applies force to pressure plate 14 as described hereafter. Housing 36 is therefore sufficiently strong to withstand the force of piston 34 pressing transition wall 56 against the brake carrier and may include reinforcing elements 60 which may be, for example, part of the frame of the EMA 20. Second portion 48 is enlarged relative to first portion 46 in order to provide a reaction surface 56; the size of second portion 46 is generally not needed to accommodate internal elements of EMA 20. Housing 36 further includes first and second mounting tabs 62 that extend normal to the piston centerline 35, and each tab 62 includes an opening 64 for receiving a fastener 66.

With reference to FIGS. 1 and 2, EMA 20 is installed on brake carrier 10 by aligning first portion 46 with slot 16 and moving EMA 20 radially with respect to brake carrier 10 until first portion 46 is received in slot 16 with transition wall 56 overlying and contacting first side 15 of brake carrier 10. Fasteners 66 are placed through openings 64 in mounting tabs 62 and into openings 22 on outer peripheral wall 18 of brake carrier 10 to secure EMA 20 to carrier 10.

In this configuration, centerline 35 of ram 34 is located radially inwardly of peripheral outer wall 18, and centerline 31 of motor 30 is located radially outwardly of outer peripheral wall 18. In this manner, the size of slot 16 can be maintained at smaller size than would be required if the entire EMA 20 had to pass through carrier 10 thus potentially increasing the strength of carrier 10. This arrangement also potentially allows for the use of a smaller brake carrier 10 than would otherwise be required. And, because a significant portion of housing 36 is located between first side 15 of brake carrier 10 and pressure plate 14, a larger gap is present between carrier 10 and pressure plate 14 and thus more air can flow between carrier 10 and brake disk stack 12. This potentially provides greater cooling to brake disk stack 12.

In operation, when a controller (not shown) causes motor 30 to drive ram 34 against pressure plate 14, the reactive force presses transition wall 56 of housing 36 against first side 15 of brake carrier 10. In this manner, substantially the entire reactive force is borne by the brake carrier 10 rather than by mounting screws as was the case in prior designs. Fasteners 66 that are strong enough to hold EMA 20 securely in place when the EMA 20 is not applying force to the brake disk stack 12 will therefore be strong enough to hold the EMA 20 in place when it is applying a force against brake disk stack 12 because they bear little, if any, of the reactive force.

In addition to reducing the number and strength of fasteners needed for securing an EMA to a brake carrier, and therefore simplifying design and assembly, the present arrangement, in many environments, advantageously allows for the removal of EMA 20 from the brake carrier 10 without removing the brake carrier 10, thus improving the line replaceability of the EMA 20. This is because there is generally nothing limiting movement of the EMA 20 in a radial direction with respect to the brake carrier 10. Furthermore, the radial insertion of EMA 20 into slot 16 in brake carrier 10 allows for easier electrical connections between these elements. Specifically, an electrical connector 68 on the underside of one of mounting tabs 62 is linearly insertable into a complimentary connector 70 on the outer peripheral wall 18 of brake carrier 10 when EMA 20 is inserted into slot 16. This allows an electrical connection to the EMA to be made at the same time as the EMA is mounted and without any additional wiring or connection steps, thus further simplifying the installation and removal of the EMA 20.

The present invention has been described herein in terms of a preferred embodiment. Obvious modifications and additions to this embodiment will become apparent to those skilled in the relevant arts upon a reading of the foregoing description. It is intended that all such modifications and additions comprises a part of the present invention to the extent they fall within the scope of the several claims appended hereto.

We claim:

1. An electromechanical actuator (EMA) comprising:
    a housing having a first side and a second side and an opening through said second side into said housing, said housing including at least one mounting tab lying in a plane;
    an electric motor supported by said housing;
    a ram having a longitudinal centerline mounted in said housing for linear movement through said opening and toward and away from said first side, said ram being operatively connected to said electric motor;
    said housing comprising a first portion at said first side having a first width, a second portion at said second side having a second width greater than said first width and a transition wall connecting said first portion to said second portion, wherein,
    said plane is parallel to the longitudinal centerline of said ram; and wherein,
    said motor has a longitudinal centerline and said plane lies between the longitudinal centerline of said ram and the longitudinal centerline of said motor.

2. The EMA of claim 1 wherein said transition wall comprises a reaction surface adapted to transmit force to a brake carrier when the ram applies force against a brake stack.

3. The EMA of claim 1 wherein said first portion has a first end spaced from said transition wall and a second end at said transition wall and said first width is substantially constant between said first end and said second end.

4. A brake actuator comprising:
    a carrier having a centerline, a periphery and a radial slot in said periphery; and
    an EMA mounted in said slot and including a housing having a first side and a second side and an opening through said second side into said housing, an electric motor supported by said housing, and a ram mounted in said housing and operatively connected to said electric motor for linear movement in a direction parallel to said carrier longitudinal centerline, and
    said housing comprising a first portion at said first side having a first width and a second portion at said second side having a second width greater than said first width and a transition wall connecting said first portion to said second portion, said first portion passing through said slot and said transition wall engaging said brake carrier and substantially preventing said second portion from moving axially toward said carrier, wherein said carrier includes a first electrical connector and said EMA includes a second electrical connector complimentary to said first electrical connector, said second electrical connector electrically contacting said first electrical connector when said EMA is inserted radially into said slot, said first electrical connector facing radially outwardly of said carrier such that moving said EMA into said slot brings said second electrical connector into electrical connection with said first electrical connector.

5. The brake actuator of claim 4 wherein said electric motor is mounted radially outwardly of said ram.

6. The brake actuator of claim 4 wherein said ram has a centerline passing through said slot and said electric motor has a centerline radially outward of said periphery.

7. The brake actuator of claim 4 including an electric motor housing enclosing said electric motor and having a width in a direction normal to the carrier centerline wherein a greatest width of said slot is less than the sum of the widths of said electric motor housing and said first width.

8. The brake actuator of claim 4 including fasteners extending into said carrier in a direction not parallel to said carrier axis.

9. The EMA of claim 1 wherein said at least one mounting tab includes at least one mounting opening having a centerline perpendicular to longitudinal centerline of said ram.

* * * * *